Jan. 29, 1946. E. C. STEINER 2,393,833
ENGINE LUBRICATION SYSTEM
Filed Jan. 14, 1942
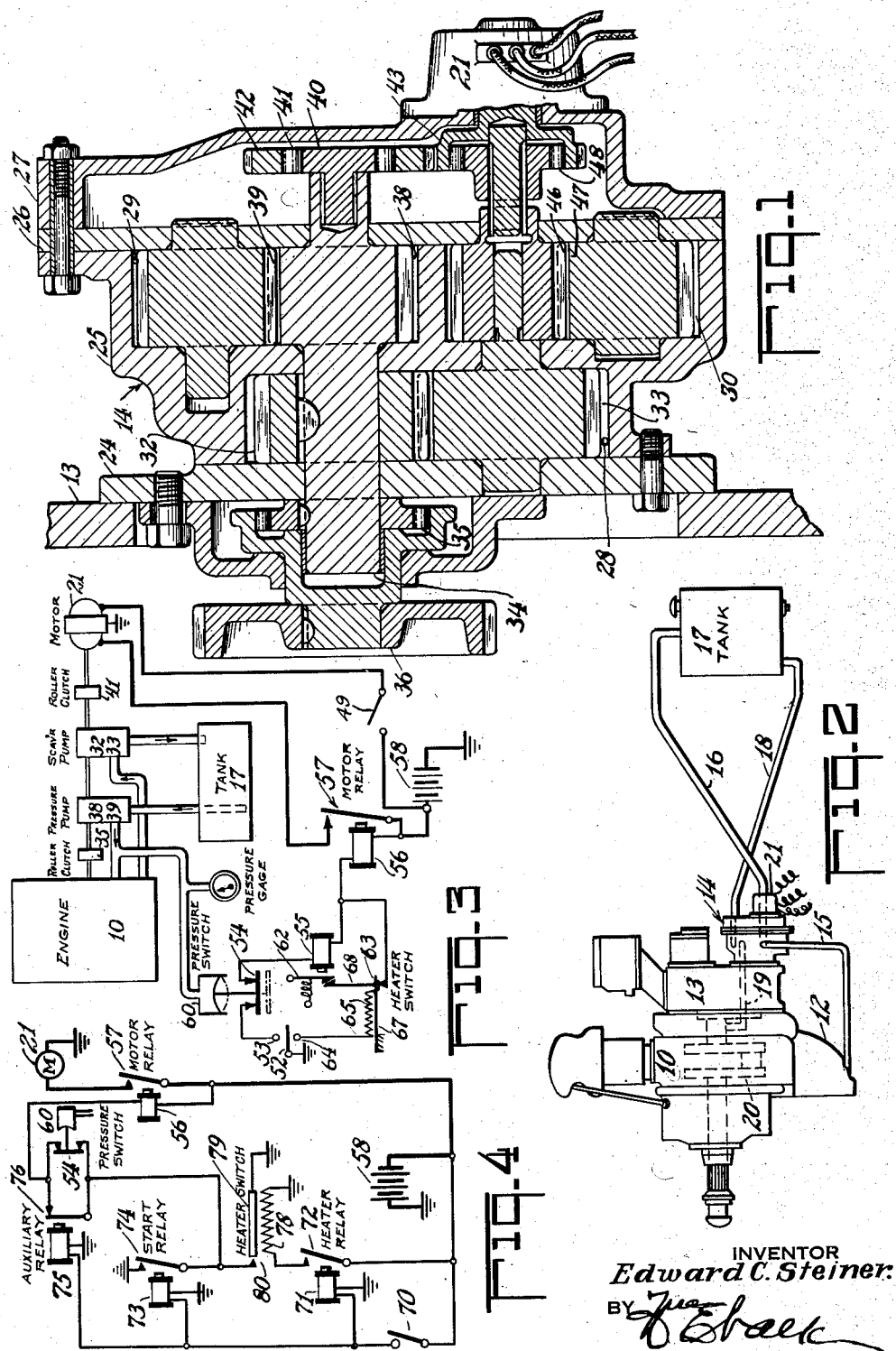
INVENTOR
Edward C. Steiner.
BY
ATTORNEY Patented Jan. 29, 1946

2,393,833

UNITED STATES PATENT OFFICE 2,393,833

ENGINE LUBRICATION SYSTEM

Edward C. Steiner, Fairlawn, N. J., assignor to Wright Aeronautical Corporation, a corporation of New York Application January 14, 1942, Serial No. 426,668

13 Claims. (Cl. 184—6)

This invention relates to lubricating systems for engines, and comprises particularly, improvements in pressure feed lubricating systems for use in aircraft engines.

An object of the invention is to provide, in an engine having a normal pressure lubricating system, means for feeding oil to the engine before starting thereof, in order that all bearing surfaces of the engine will be flood lubricated at the instant of starting. In the conventional system, an engine driven oil pump is supplied with lubricant from a suitable reservoir and at the time the engine is started, there is no oil pressure in the system, such pressure being developed later as the oil pump starts with the engine. If an engine has been stopped for a substantial interval of time, it is quite possible that the bearing surfaces are comparatively dry and are thus unlubricated during the first few revolutions of the engine parts, resulting in a degree of wear which is large compared with the amount of wear which may occur during normal engine operation when all bearing surfaces are flood lubricated.

A further object of the invention is to provide means to scavenge excess oil from the engine after the engine has been stopped. Such an arrangement is particularly appropriate in aircraft engines which conventionally utilize a "dry sump" system. In operation, a considerable amount of the total oil supply is whirled around inside of the engine which, when the engine stops, settles in the bottom of the engine or in its sump. Obviously, after the engine is stopped, the usually provided scavenging oil pump does not remove this surplus oil from the engine to deposit it in the reservoir. Thus, after-running of the engine scavenging pump serves to remove the surplus oil accumulations to leave the interior of the engine substantially dry during the shut-down period. One purpose of this feature is to prevent the oil level from rising to a point where it can flow into the lower engine cylinders. This is a condition that many times results in damage to engine parts upon starting the engine because of the resulting quantity of oil in these lower cylinder heads.

A further object of the invention is to provide an oil pump assembly having a driving connection with an engine and also having a driving connection with a separate prime mover, whereby during engine operation the pump is engine driven, and whereby during engine standby, the pump may selectively be driven by the prime mover.

A further object of the invention is to provide an oil pump unit and mechanical drive connections therein, and a prime mover energizable in one direction to drive the pump unit for engine oil supply and scavenging and in the other direction for energizing an auxiliary pump suitable for supplying hydraulic fluid pressure for engine auxiliaries or other devices.

A further object of the invention is to provide a control system for an oil pump unit drivably related to an engine and to a prime mover which shall be coincidentally operable with the basic engine starting and stopping control device such, for instance, as the engine ignition switch. A further object is to arrange an oil pump control system in such a manner that same will be energized for engine oil priming when the ignition switch is turned on, which shall de-energize the auxiliary pump prime mover when the engine is in normal operation, and which shall re-energize the pump auxiliary prime mover for a determinate time interval after the ignition switch has been turned off and after the engine has stopped.

Further objects of the invention will become apparent in reading the annexed detailed description in connection with the drawing, in which:

Fig. 1 is a longitudinal section through a multiple oil pump unit incorporating alternate driving means therefor;

Fig. 2 is a side elevation of an engine and oil tank assembly, showing the general connections between the pump system, engine, and tank;

Fig. 3 is a diagrammatic view of one arrangement of an auxiliary lubricating control system; and Fig. 4 is a wiring diagram of an alternate type of lubricating control system.

Referring first to Fig. 2, I show an engine 10 which for convenience is represented as a radial cylinder aircraft engine. This engine is provided with an oil sump 12 into which surplus oil within the engine crankcase is deposited by gravity. To the rear accessory section 13 of the engine, an oil pump unit 14 is secured, this unit containing a pressure pump and a scavenging pump as will shortly become apparent. The scavenging pump receives surplus oil from the sump 12 through a pipe 15 and delivers it through a pipe 16 to an oil tank 17. From the bottom of the tank, oil is led through a pipe 18 to the intake side of a pressure pump in the unit 14 whence it is delivered through passages such as 19 within the engine to engine components one of which is shown as the crankshaft 20.

The pump unit 14 is also provided with an electric motor 21, drivably related to the pressure and scavenging pump as will become apparent.

Now, reference may be made to Fig. 1. The unit 14 comprises a base 24 secured to the engine accessory section 13, and pump housing casings 25, 26, and 27 are serially secured thereto. The casing 25 defines a scavenging pump cavity 28, a pressure pump cavity 29, and an auxiliary pump cavity 30, these cavities being closed by other casing members. The pump cavity 28 contains a drive gear 32 meshed with an idler gear 33, the gear 32 being keyed to a shaft 34 having a one-way roller clutch connection 35 with a drive member 36 which, as shown, comprises a gear adapted to be driven by the accessory gear train of the engine 10. The pressure pump cavity 29 contains a power gear 38 integral with the shaft 34, meshed with an idler gear 39. During normal engine operation the gear 36 is engine driven and drives the two pump gears 32 and 38 through the one-way clutch 35, the pressure pump comprised by the gears 38 and 39 receiving lubricating oil from the tank 17 and delivering it to the engine. The pump comprised by the gears 32 and 33 receives oil from the sump 12 and delivers it to the tank 17.

A one-way clutch cam 40 is splined to the right-hand end of the shaft 34 and one-way clutch rollers 41 engage this cam 40 and also engage an embracing gear and outer race unit 42, the gear 42 being meshed with an output gear 43 forming the drive element of the electric motor 21 secured to the pump housing. The roller clutches 35 and 41 are both of the same hand so that the pumps may be driven either by the engine or by the electric motor 21. When the engine is driving, the clutch 41 overruns while, when the electric motor 21 is driving through the clutch 41, the clutch 35 overruns.

In the pump unit 14, in the cavity 30, I include pump gears 46 and 47 which comprise an auxiliary pump drivably connected to the electric motor 21 through a one-way clutch 48. The gear 46 as illustrated is journaled about an extension of the idler gear 33. This clutch 48 is of such hand that when the motor 21 is reversed in a direction from that normally required to drive the pressure and scavenging pumps, it will drive the pump comprised by the gears 46 and 47. During normal operation of the engine, the electric motor drive for the scavenging and motor pump is unnecessary and accordingly, said motor may be reversed to drive the pump 46, 47 to supply hydraulic fluid to another engine, power plant or aircraft accessories.

Reference may now be made to Fig. 3 which shows the several mechanical components of the system in diagrammatic form and which also shows an electrical control system for the motor 21. Control of the motor 21 is primarily afforded by a S. P. D. T. switch 52, the arm of which is grounded. The arm of this switch is preferably coincidentally operable with the ignition switch of the engine, its upper contact point 53 being engaged by the switch arm when the ignition switch is "on." The point 53 is connected to a normally closed oil pressure operated switch 54, in turn connected to a solenoid 55 which in turn is connected to a solenoid 56 of a normally open motor relay 57. The solenoid 56 is connected, as shown, to a power supply and thence to ground. The relay switch 57 is connected at one end to the power supply 58 and at its other end to the motor 21 and thence to ground. When the switch 52 is closed on the contact 53, the relay solenoid 56 is energized and the motor 21 is started, operating the oil pumps through the roller clutch 41 to build up oil pressure in the engine in anticipation of engine starting by conventional means, not shown. Power available from the motor 21 serves to build up pump pressure for full lubrication of engine bearing surfaces, and when the engine is started, the drive for the pumps switches from the roller clutch 41 to the roller clutch 35, leaving the motor 21 idle. As an adequate amount of oil pressure builds up, it will act upon the hydraulic cell 60 of the pressure switch 54, opening said switch and de-energizing the relay 57 and the motor 21. When the motor 21 was in operation, the solenoid 55 was energized, which attracted a hook armature 62 to allow the closure of a switch 63 which will be described in detail shortly.

When the engine is to be stopped, the ignition switch is moved to the "off" position which coincidentally moves the arm of the switch 52 to engage a contact point 64. This energizes a heater coil 65 serially connected with the switch 63 which in turn is connected to the solenoid 56 and to the power source 58. The motor 21 is thus started to operate the oil pumps after the engine has stopped, thereby scavenging surplus oil from the engine. It should be appreciated that the capacity of the scavenging pump 32, 33 is considerably greater than that of the pressure pump 38, 39 so that, although the pressure pump will feed oil to the engine, the scavenging pump will more than take care of such supply and thus can remove surplus oil accumulations from the engine. The heater 65 gradually warms an arm 67 on which the upper contact of the switch 63 is mounted, the warming of this arm causing its eventual distortion and opening of the switch 63. Upon opening of the switch, a hook 68 attached to the arm 67 hangs up on the hook 62, preventing re-closure of the switch 63 after the heater circuit has been broken. This circuit may not be re-energized until the switch 52 has been moved to close with the contact 53 which as above indicated, serves to unhook the arm 67 for re-closure of the switch 63.

The heater switch is preferably arranged to run the motor 21 for a period of several minutes after the engine has been shut down. This timing system makes the arrangement substantially foolproof so that the engine operator need not wait to turn off the motor 21 but may consider his duties over, so far as engine control is concerned, immediately after he has turned off the engine ignition switch.

In order to effect reverse operation of the motor 21 for operation of the pump 46, 47 as previously described, the motor 21 is provided with a second circuit connection to the power source 58 through a switch 49 as illustrated in Fig. 3. When the switch 57 is open and the motor 21 is not energized for operation of the scavenging pump, the switch 49 may be closed to effect reverse operation of the motor 21 for driving the pump 46, 47. During this reverse operation of the motor 21, the one way clutch 41 overruns.

Fig. 4 shows an alternate electrical control system for the motor 21 in which the pressure switch 54, 60, the motor relay 57, and the power source 58, are the same as in the arrangement of Fig. 3. This arrangement, however, makes use of a S. P. S. T. control switch 70 which preferably is coincidentally operable with the engine ignition switch, the switch 70 being closed as the engine ignition switch is turned "on" and being opened when the engine ignition switch is turned "off." Upon closure of the switch 70, relay solenoids 71, 73, and 75 are energized which respectively close normally open switches 72 and 74, and open a normally closed switch 76. The switch 74 is grounded at one end and its other end is serially connected through the normally closed pressure switch 54 and the motor relay solenoid 56 to the power source so that the motor relay 57 is closed and the motor is started. When oil pressure builds up, after engine starting, the oil pressure switch 54 is opened, de-energizing the motor relay 57.

When the switch 72 of the heater relay is closed, coincidentally with starting of the motor 21, a heater element 78 is energized which in the course of time, expands a rod 79, to close the switch 80 which switch when closed shunts the switch 74. When the engine is stopped by opening its ignition switch, at which time the switch 70 is opened, the heater switch 80 remains closed. Likewise, the auxiliary relay 75 is de-energized to allow closure of its switch 76 which is shunted around the pressure switch. The switches 80 and 76, therefore, close the circuit to the relay 57 to start the motor 21 regardless of the position of the pressure switch 54. The motor 21 then runs for a certain time interval (preferably several minutes) after engine stoppage until the heater element 79 cools and opens the switch 80, thereby scavenging engine oil from the engine.

It will be seen that the arrangement of Fig. 4 secures substantially the same functional results as are secured in the arrangement of Fig. 3 but it has the added advantage of using only a single throw single pole control switch, instead of the double throw control switch of Fig. 3, and also utilizes a commercially available heater switch 78, 79, 80 as well as commercially available relays. Both arrangements, as shown in Figs. 3 and 4, accomplish the desired effect of enabling the engine oil pumps to be started before the engine is started, and to continue the operation of the engine oil pump for a definite time interval after the engine has been stopped.

If desired, the auxiliary pump 46, 47 shown in Fig. 1 may be arranged as an auxiliary scavenging pump and it may be operated selectively by reversal of the motor 21 through conventional electrical connections, not shown, to scavenge oil from the engine sump should the normal system fail to operate properly, or should occasional engine scavenging during standby periods be desired to prevent oil loading of the engine due to leakage from the oil tank.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine having a pressure-lubrication system, a pressure pump for charging said system, a scavenging pump for draining said system, a separable driving connection between the engine and said pumps, an electric motor drivably connected with said pumps, and means to energize said motor before engine starting and after engine stoppage respectively to charge the lubrication system and to drain the scavenging system, said driving connections between engine and pumps and between motor and pumps, comprising one-way clutches whereby either the engine or the motor may drive the pumps while, respectively, the motor or engine is stopped.

2. In combination with an engine having a normally engine driven pump unit for lubricating the engine, a reversible electric motor having a freewheel driving connection with said pump unit, operable when the engine is stopped to charge engine lubrication system, a driven auxiliary, and a free-wheel driving connection between said motor and said auxiliary, of opposite hand from the first freewheel driving connection, whereby reverse motor operation drives said auxiliary regardless of engine operation.

3. In combination with an engine having a normally engine driven pump unit for lubricating the engine, a reversible electric motor having a freewheel driving connection with said pump unit, operable when the engine is stopped to charge engine lubrication system, a driven auxiliary, and a freewheel driving connection between said motor and said auxiliary, of opposite hand from the first freewheel driving connection, whereby reverse motor operation drives said auxiliary regardless of engine operation, the drive from said engine to said pump also including a freewheel driving connection to allow pump operation by forward motor operation when the engine is not running.

4. In combination with an engine, an on-off ignition switch therefor, an oil-pressure lubrication system, an engine driven oil-pressure pump for charging said system, an engine driven oil pressure scavenging pump for draining said system, said scavenging pump having a larger capacity than said pressure pump, auxiliary means energizable in response to operation of said ignition switch to its on-position to effect operation of said pumps prior to and during engine starting and energizable in response to subsequent operation of said ignition switch to its off-position to effect operation of said pumps for a time interval thereafter, and means to de-energize said auxiliary means during normal engine operation.

5. In an engine having a sump, a pump operable to remove oil from said sump, means automatically operative after the engine is stopped for effecting operation of said pump, and timing mechanism automatically operative at a predetermined length of time after the engine is stopped for terminating said pump operation.

6. In an engine having a sump, a pump operable to remove oil from said sump, means automatically operative when the engine is stopped for effecting operation of said pump, and timing mechanism including means automatically operative at a predetermined length of time after the engine is stopped for terminating said pump operation.

7. In an engine having a sump, a pump operable to remove oil from said sump, means automatically operative when the engine is stopped for effecting operation of said pump, and timing mechanism activated when said engine is stopped, and means operated by said timing mechanism at a predetermined length of time after the engine is stopped for terminating said pump operation.

8. In an engine having a sump, a pump operable to remove oil from said sump, means automatically operative to effect operation of said pump after the engine is stopped, and timing mechanism having means automatically activated when said engine is stopped and having means automatically operative at a predetermined time after said activation for effecting termination of said pump operation.

9. In an engine having a sump, a pump drivably connected to said engine for removing oil from said sump, power means drivably connected to said pump and automatically operative for effecting operation of said pump after the engine is stopped, means permitting said power means to drive said pump without also driving said engine, and timing mechanism including means automatically operative at a predetermined length of time after said engine stoppage for terminating said pump operation.

10. In an engine having a sump, a pump drivably connected to said engine for removing oil from said sump, power means drivably connected to said pump and automatically operative to effect operation of said pump after the engine is stopped, each said driving connection comprising a one-way drive such that said engine can drive said pump without also driving said power means and said power means can drive said pump without also driving said engine, and timing mechanism automatically operative at a predetermined length of time after the engine is stopped for terminating said pump operation.

11. In an engine having a sump, a pump operable to remove oil from said sump, means operable to stop said engine, power means automatically operative when the engine is stopped for effecting operation of said pump, and timing mechanism automatically operative at a predetermined length of time after the engine is stopped for terminating said pump operation.

12. In an engine having a sump, a pump automatically operative to remove oil from said sump after said engine is stopped, means operable to stop said engine, and timing mechanism, said timing mechanism having means automatically activated when said engine is stopped and having means automatically operative at a predetermined time after said activation for effecting termination of said pump operation.

13. In an engine having a sump, an ignition switch for said engine, a pump automatically operative to remove oil from said sump after said ignition switch is operated to stop said engine, and timing mechanism automatically operative at a predetermined length of time after operation of said ignition switch for terminating operation of said pump.

EDWARD C. STEINER.